US 8,457,889 B2

(12) United States Patent
Feyereisen et al.

(10) Patent No.: US 8,457,889 B2
(45) Date of Patent: Jun. 4, 2013

(54) WAYPOINT DISPLAY SYSTEM AND METHOD

(75) Inventors: Thea L. Feyereisen, Hudson, WI (US); Gang He, Morristown, NJ (US); Ivan Wyatt, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1463 days.

(21) Appl. No.: 12/059,728

(22) Filed: Mar. 31, 2008

(65) Prior Publication Data
US 2009/0248297 A1 Oct. 1, 2009

(51) Int. Cl.
G01C 21/00 (2006.01)
G01C 21/20 (2006.01)

(52) U.S. Cl.
CPC .................................... G01C 21/20 (2013.01)
USPC ................ 701/467; 701/3; 701/16; 701/206; 340/967; 340/974

(58) Field of Classification Search
CPC ..................................................... G01C 21/20
USPC ................ 701/3, 16, 206, 467; 340/973, 975
See application file for complete search history.

(56) References Cited

U.S. PATENT DOCUMENTS

| 5,289,185 | A | * | 2/1994 | Ramier et al. ................ 340/974 |
| 5,420,582 | A | * | 5/1995 | Kubbat et al. ................ 340/974 |
| 5,936,553 | A | | 8/1999 | Kabel |
| 6,150,960 | A | | 11/2000 | Voulgaris |
| 6,573,841 | B2 | | 6/2003 | Price |
| 6,907,234 | B2 | | 6/2005 | Karr et al. |
| 6,972,696 | B2 | | 12/2005 | Rogers et al. |
| 6,985,091 | B2 | | 1/2006 | Price |
| 7,216,069 | B2 | | 5/2007 | Hett |
| 7,280,896 | B2 | | 10/2007 | Morizet et al. |
| 7,672,758 | B2 | * | 3/2010 | Astruc ............................ 701/4 |
| 2002/0140810 | A1 | | 10/2002 | Winikka |
| 2003/0132860 | A1 | | 7/2003 | Feyereisen et al. |
| 2003/0193411 | A1 | | 10/2003 | Price |
| 2003/0195672 | A1 | | 10/2003 | He |
| 2004/0006423 | A1 | | 1/2004 | Fujimoto et al. |
| 2004/0225420 | A1 | * | 11/2004 | Morizet et al. ................ 701/4 |
| 2005/0024237 | A1 | * | 2/2005 | Gannett ....................... 340/967 |
| 2005/0200502 | A1 | | 9/2005 | Reusser et al. |
| 2005/0251290 | A1 | * | 11/2005 | Skourup et al. .............. 700/245 |
| 2006/0227012 | A1 | * | 10/2006 | He ................................. 340/945 |
| 2006/0227036 | A1 | * | 10/2006 | Blaskovich et al. ........... 342/29 |

(Continued)

FOREIGN PATENT DOCUMENTS

WO WO 0065423 A9 * 11/2000
WO WO 2007083418 A1 * 7/2007

OTHER PUBLICATIONS

EP Search Report, EP 09155419.6 dated Feb. 23, 2010.

*Primary Examiner* — Ryan Zeender
*Assistant Examiner* — Hunter Wilder
(74) *Attorney, Agent, or Firm* — Ingrassia Fisher & Lorenz, P.C.

(57) ABSTRACT

A display system and method for a vehicle are provided. The display system includes a processor configured to receive data representative of a waypoint and terrain and to supply display commands associated with the waypoint and the terrain; and a display device coupled the processor for receiving the display commands and operable to render three-dimensional terrain and a first symbol elevated from the terrain representing the waypoint.

17 Claims, 3 Drawing Sheets

U.S. PATENT DOCUMENTS

| | | | |
|---|---|---|---|
| 2007/0010942 A1* | 1/2007 | Bill | 701/209 |
| 2007/0179703 A1 | 8/2007 | Soussiel et al. | |
| 2007/0225876 A1* | 9/2007 | Caillaud et al. | 701/16 |
| 2008/0195309 A1 | 8/2008 | Prinzel, III et al. | |
| 2009/0024261 A1* | 1/2009 | Rouquette et al. | 701/16 |
| 2009/0030564 A1* | 1/2009 | Peterson | 701/3 |

* cited by examiner

WAYPOINT DISPLAY SYSTEM AND METHOD

TECHNICAL FIELD

The present invention generally relates to aircraft display systems and methods, and more particularly, to systems and methods for the enhanced display of waypoints.

BACKGROUND

Computer generated aircraft displays have become highly sophisticated and are capable of displaying a substantial amount of flight management, navigation and control information, which gives flight crews more effective control of their aircraft and helps to reduce their workload. In this regard, electronic displays, such as Heads-Up Displays (HUDs) and Heads-Down Displays (HDDs), are used in aircraft as Primary Flight Displays to display important flight management, navigation and control information to flight crews.

Primary Flight Displays are computer-generated displays that provide flight crews with real-time visual representations of the operational states of their aircraft during flights. For example, the Primary Flight Display can combine critical flight instrumentation (e.g., altitude, attitude, heading, airspeed, vertical speed instruments) and primary engine instrument indicators into a single, readily interpretable display. As a result, Primary Flight Displays have become effective visual tools for controlling aircraft, reducing pilot workload, increasing situational awareness, and improving overall flight safety.

Certain flight information displayed on Primary Flight Displays, particularly navigation information such as waypoints, is important for maintaining proper aircraft safety and control. However, other displayed symbology, such as the aircraft's current pitch, heading, flight path, and target information, may be displayed on or around the waypoints to clutter or obscure these portions of the Primary Flight Display. This is particularly an issue when the aircraft is at a relatively great distance from the waypoints.

Accordingly, it is desirable to provide systems and methods that increase the visibility of certain flight information on a visual display, such as, for example, a Primary Flight Display, similar electronic aircraft displays, and other types of electronic displays. Particularly, it is desirable to provide systems and methods for increasing the visibility of waypoints on the display. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with one exemplary embodiment, a display system for a vehicle is provided. The display system includes a processor configured to receive data representative of a waypoint and terrain and to supply display commands associated with the waypoint and the terrain; and a display device coupled the processor for receiving the display commands and operable to render three-dimensional terrain and a first symbol elevated from the terrain representing the waypoint.

In accordance with another exemplary embodiment, a method is provided for displaying a waypoint on terrain within a three-dimensional visual display of a vehicle. The method includes determining a distance of the waypoint from the vehicle; and displaying a symbol representing the waypoint on the terrain as a function of the distance.

In accordance with yet another exemplary embodiment, a display system for a vehicle is provided. The display system includes a processor configured to receive data representative of a waypoint and terrain and to supply display commands associated with the waypoint and the terrain; and a display device coupled the processor for receiving the display commands and operable to render three-dimensional terrain and a first symbol representing the waypoint elevated from the terrain and anchored to the terrain. The first symbol is replaced by a second symbol representing the waypoint when the vehicle approaches the waypoint, the second symbol conforming to the terrain.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments described herein are provided for increasing the visibility of waypoints on electronic displays, such as, for example, Primary Flight Displays, similar types of visual displays, or electronic displays for other types of vehicles. More specifically, waypoints can appear elevated from the terrain at certain distances from the aircraft, and conform to the terrain as the aircraft approaches the waypoint.

Figure 1:
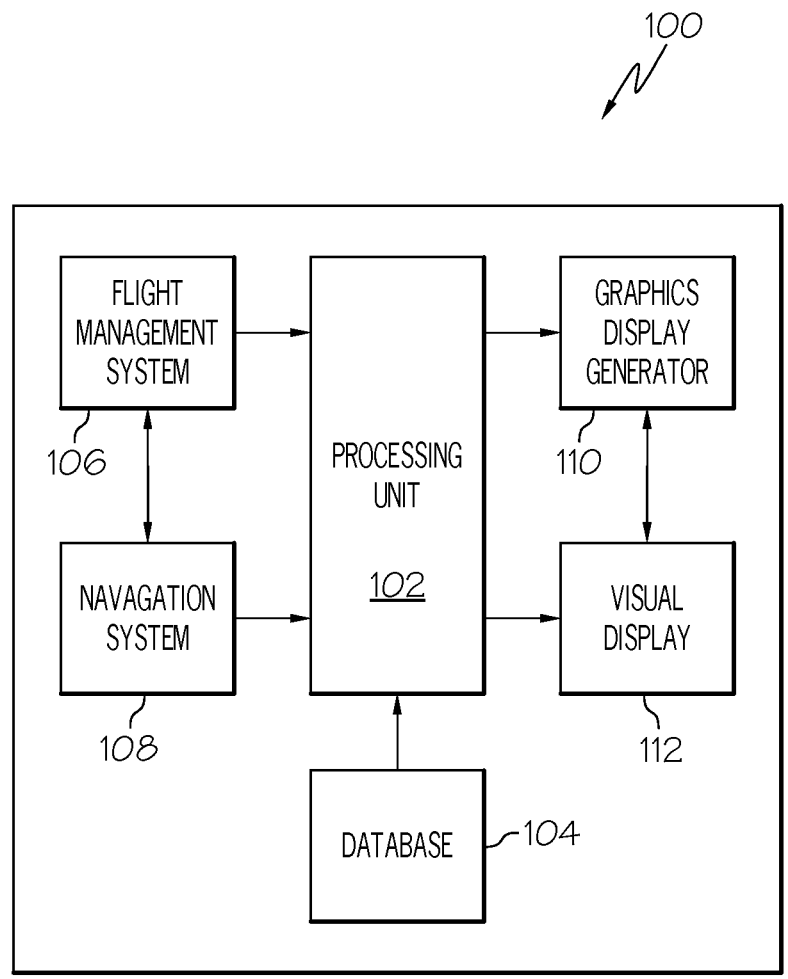
FIG. 1 is a functional block diagram of a display system according to an exemplary embodiment.

FIG. 1 depicts a block diagram of an exemplary display system 100 for increasing the visibility of waypoints on a visual display. The system 100 includes a processing unit 102, a database 104, a flight management system 106, a navigation system 108, a graphics display generator 110, and a visual display 112. Notably, it should be understood that although the system 100 appears in FIG. 1 to be arranged as an integrated system, the system 100 is not so limited and can also include an arrangement whereby one or more of the processing unit 102, the database 104, the flight management system 106, the navigation system 108, the graphics display generator 110, and the visual display 112 is a separate component or a subcomponent of another system located either onboard or external to an aircraft. Also, for example, the system 100 can be arranged as an integrated system (e.g., aircraft display system, Primary Flight Display system, etc.) or a subsystem of a more comprehensive aircraft system (e.g., flight management system, navigation and control system, target aiming and control system, collision alert and/or avoidance system, weather avoidance system, etc.). The system 100 can be utilized in an aircraft, such as a helicopter, airplane, or unmanned vehicle. Moreover, exemplary embodiments of the system 100 can also be utilized in spacecraft, ships, submarines, or other types of vehicles. For simplicity, embodiments are described below with reference to "aircraft."

For this embodiment, the processing unit 102 can be a computer processor such as, for example, a microprocessor, digital signal processor, or any suitable processor capable of at least receiving and/or retrieving aircraft flight management information (e.g., from the flight management system 106), navigation and control information (e.g., from the navigation system 108), and target and/or terrain information (e.g., from the database 104); generating display control signals for a visual display of the aircraft flight management information, the navigation and control information (including, for example, a zero pitch reference line, one or more heading indicators, tapes for airspeed and altitude, etc.), target, waypoint, and/or terrain information, and a flight path marker (or similar type of aircraft aiming symbol); and sending the generated display control signals to a graphics display generator (e.g., the graphics display generator 110) associated with a visual display (e.g., the visual display 112).

The database 104 is coupled to the processor 102 and can be a memory device (e.g., non-volatile memory, disk, drive, tape, optical storage device, mass storage device, etc.) that can store digital waypoint and target location data and terrain data (e.g., latitudinal and longitudinal data) as either absolute coordinate data or as a function of an aircraft's position. The database 104 includes data defining the actual geographical boundaries of numerous airports and runways. The database 104 can also include, for example, a terrain database, which can include the locations and elevations of natural terrain obstacles such as mountains or other elevated ground areas, and also the locations and elevations of man-made obstacles such as radio antenna towers, buildings, bridges, etc. Navigation data stored in the database 104 can be received from external, up-linked sources, or an onboard device that senses and maps man-made obstacles (e.g., airports, runways, etc.) and variations in terrain, such as, for example, a Forward Looking Infrared (FLIR) sensor, or an active or passive type of radar device.

The flight management system 106 and the navigation system 108 are coupled to processing unit 102. The flight management system 106 and/or the navigation system 108 can provide navigation data associated with the aircraft's current position and flight direction (e.g., heading, course, track, etc.) to the processing unit 102. The navigation data provided to the processing unit 102 can also include information about the aircraft's airspeed, altitude, pitch, and other important flight information, if such information is desired. In any event, for this exemplary embodiment, the flight management system 106 and/or the navigation system 108 can include any suitable position and direction determination devices that are capable of providing the processing unit 102 with at least an aircraft's current position (e.g., in latitudinal and longitudinal form), the real-time direction (heading, course, track, etc.) of the aircraft in its flight path, the waypoints along the flight path, and other important flight information (e.g., pitch, airspeed, altitude, attitude, etc.). Information can be provided to the processing unit 102 by, for example, an Inertial Reference System (IRS), Air-data Heading Reference System (AHRS), and/or a global positioning system (GPS).

For this embodiment, the system 100 also includes the graphics display generator 110 coupled to the processing unit 102 and the visual display 112. The visual display 112 may include any device or apparatus suitable for displaying various types of computer generated symbols and information representing at least pitch, heading, flight path, airspeed, altitude, waypoints, targets, terrain and flight path marker data in an integrated, multi-color or monochrome form. Using data retrieved (or received) from the flight management system 106 and/or the navigation system 108, the processing unit 102 executes one or more algorithms (e.g., implemented in software) for determining the position of waypoints, a flight path marker, a zero pitch reference line, and heading indicators on the visual display 112. The processing unit 102 then generates a plurality of display control signals representing the waypoints, flight path marker, zero pitch reference line, heading indicators, and airspeed and altitude tapes (along with target and terrain data from the database 104), and sends the plurality of display control signals to the visual display 112 via the graphics display generator 110. In this embodiment, the visual display 112 is an aircraft cockpit, multi-color display (e.g., a Primary Flight Display). The graphics display generator 110 interprets the display control signals and generates suitable waypoints, flight path marker, zero pitch reference line, heading indicator, airspeed tape, altitude tape, target, and terrain symbols, which are presented on a screen or monitor of the visual display 112.

Although a cockpit display screen may be used to display the above-described flight information symbols and data, any suitable type of display medium capable of visually presenting multi-colored or monochrome flight information for a pilot or other flight crew member can be provided, such as, for example, various CRT and flat-panel display systems (e.g., CRT displays, LCDs, OLED displays, plasma displays, projection displays, HDDs, HUDs, etc.).

Figure 2:
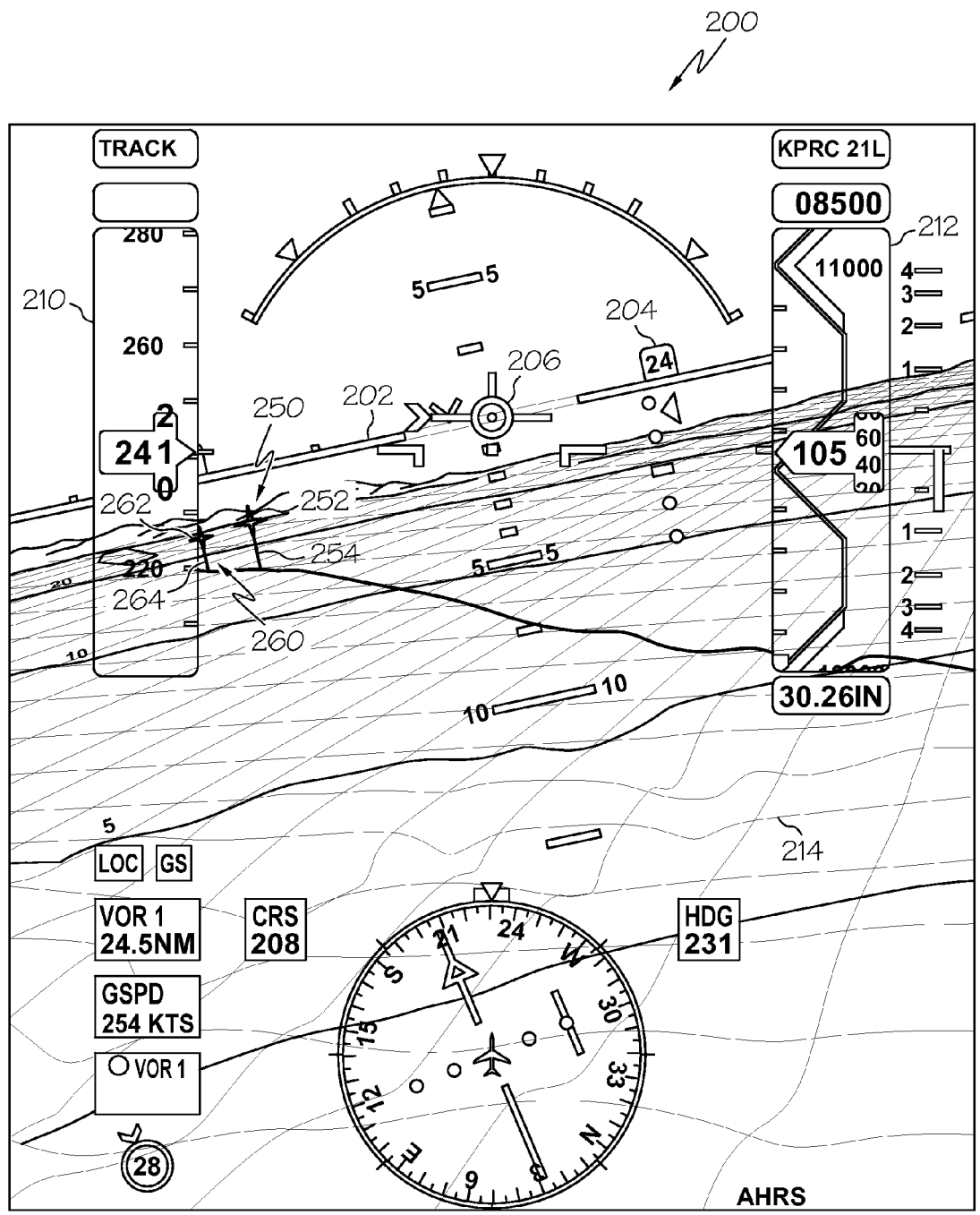
FIG. 2 depicts an exemplary image that may be rendered by the system of FIG. 1.

FIG. 2 depicts an exemplary visual display 200 that may be rendered by the flight deck display system 100 of FIG. 1. The display 200 shows, among other things, computer generated symbols representing a zero pitch reference line (e.g., commonly referred to as a horizon line) 202, two heading indicators 204, a flight path marker (also known as a flight path vector or velocity vector) 206, an airspeed scale or tape 210, an altitude scale or tape 212, and terrain (e.g., identified generally as element 214). In this embodiment, the terrain 214 is rendered as a three-dimensional, perspective view. The terrain 214 can include any representation of the environment surrounding the aircraft, including flattened terrain. Additionally, the terrain 214 can include a virtual plane selected by a pilot at certain elevation relative to the aircraft and is rendered at that elevation. Although the display 200 is shown as an egocentric, first-person frame of reference, the display 200 can be a secondary, wingman, and/or plan or perspective view that enables a viewer to view the aircraft, as well as zoom in and out.

In addition, and as will now be described in more detail, the display 200 may also selectively render information representative of one or more waypoints 250, 260. The waypoints 250, 260 may be any intended destination or other type of geo-referenced symbol along a flight path. During operation, the pilot typically locates the waypoints 250, 260 on the display 200, and aims the aircraft in the direction of the waypoint 250, 260. The location and placement of the waypoints 250, 260 can be identified from a flight plan, user selected from the database 104 (FIG. 1), provided by a user via one or more of the user interfaces (e.g., keyboard, CCD, voice control, mind responsive device), or provided or selected from the external data sources, for example, with a datalink to the cockpit from the ground.

FIG. 2 shows two waypoints 250, 260 that are to be sequentially navigated and that are a predetermined distance from the aircraft. The waypoint 250 is the closer waypoint, and the waypoint 260 is the more distant waypoint. The representation of waypoints 250, 260 may be a function of the distance of the waypoints 250, 260 from the aircraft. As will be described in further detail below, the waypoints 250, 260 can be modified as the aircraft approaches.

The waypoints 250, 260 are sized and shaped to increase visibility, particularly at relatively large distances. In this embodiment, each of the waypoints 250, 260 has an elevated portion 252, 262 that is elevated relative to the terrain 214, and in this case, is star-shaped. Each of the elevated portions 252, 262 may further include a line 254, 264 that is anchored to terrain 214. Generally, the elevated portions 252, 262 of the waypoints 250, 260 are displayed in a scale that is larger than the terrain 214. In other words, the waypoints 250, 260 have larger symbolic representations that those in most conventional displays to provide increased visibility. The size and color of the waypoints 250, 260 can also vary as a function of distance from the aircraft, and can, for example, become smaller or change color as the aircraft gets closer. The elevated nature and dynamic size and color of the waypoints 250, 260 increases visibility and awareness, without otherwise cluttering the display 200. Although the elevated portion 252, 262 of the waypoint 250, 260 is star-shaped, other shapes, such as circular, rectangular, trapezoidal or other shapes, can be provided. The waypoints 250, 260 can have the same or different colors. In one embodiment, the waypoints 250, 260 have different colors that indicate their sequential navigation order. The waypoints 250, 260 can also vary as a function of use conditions. As an example, the waypoint 250 is a final approach fix at which point the aircraft must attain certain speed and altitude combination to land safely. The waypoint 250, 260 can be accordingly colored or shaped or associated with certain textual information to indicate such conditions. Similarly, each waypoint 250, 260 may have an airspeed associated with it. The specific symbology and/or appearance of the waypoint 250, 260 may be sensitive to the aircraft's energy state and communicate that information to the flight crew.

Figure 3:
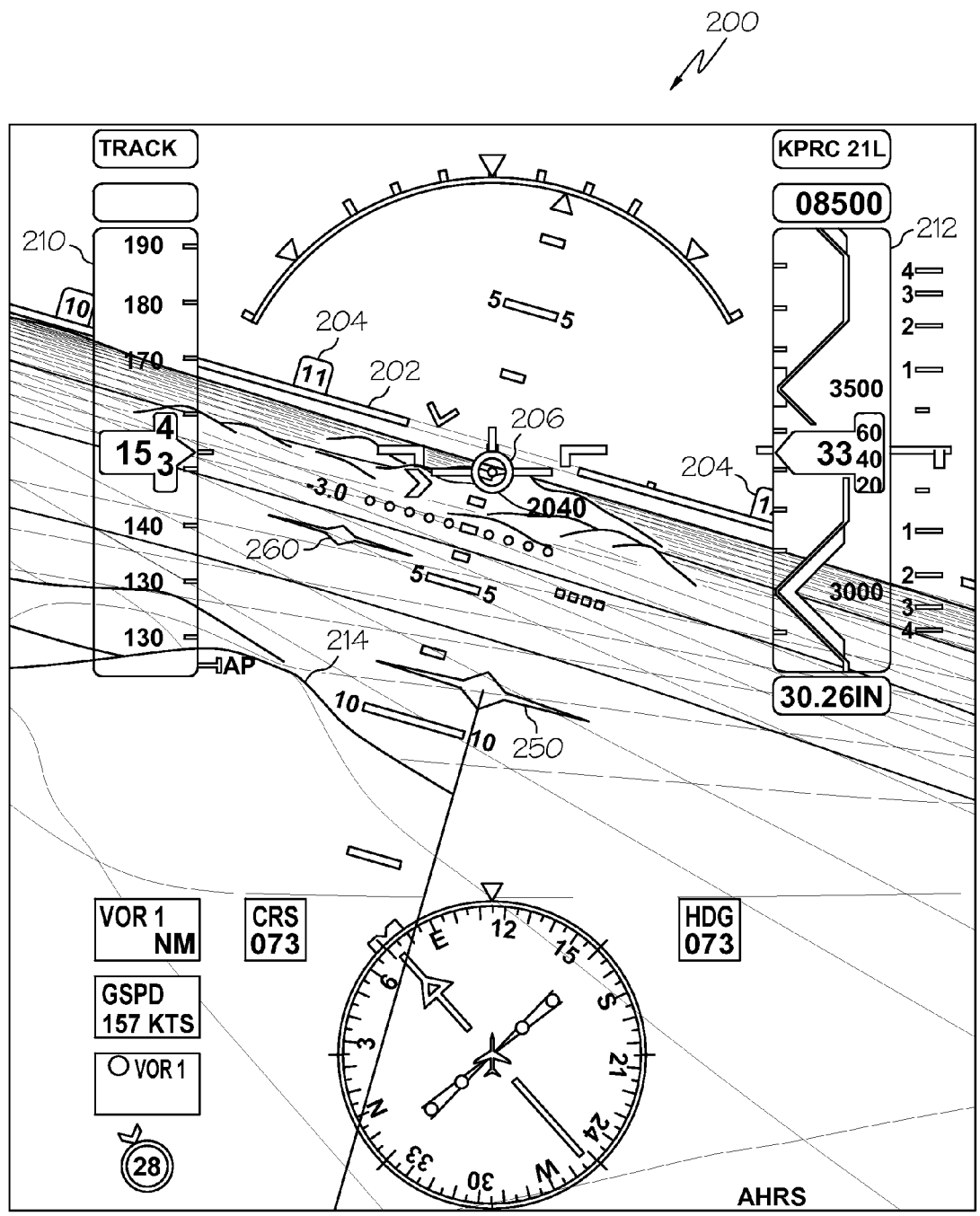
FIG. 3 depicts another exemplary image that may be rendered by the system of FIG. 1.

FIG. 3 depicts another exemplary image that may be rendered by the system 100 of FIG. 1. Generally, FIG. 3 is similar to FIG. 2, except that the aircraft is at a closer distance to the waypoints 250, 260. In contrast to FIG. 2, the waypoints 250, 260 are no longer elevated. In this embodiment, as the aircraft approaches the waypoints 250, 260, the waypoints 250, 260 conform to the terrain 214. By tracing the terrain 214, the waypoints 250, 260 are not obscured by the three-dimensional nature of the terrain 214. Typically this may occur when waypoint is less than several miles ahead or when waypoint presentation may obscure other information such as direct path to a landing target. The waypoints 250, 260 of FIG. 3 can have the same or different shape from the waypoints 250, 260 of FIG. 2.

In this embodiment, each of waypoints 250, 260 has an approach or flight path for navigating the aircraft to the waypoints 250, 260. If the aircraft deviates from the approach, the waypoints 250, 260 can change color to alert the pilot. Additionally, the waypoints 250, 260 can fade-out or become more transparent as the aircraft approaches. This can decrease the clutter on the visual display as the pilot attempts to navigate past the waypoints 250, 260. Other important flight information, such as, for example, airspeed and altitude readings, and underlying terrain and target information, are not obscured by the waypoints 250, 260. The waypoint 250, 260 may fade in and out may be controlled by the distance to the waypoint 250, 260 or by the time the aircraft will reach the waypoint 250, 260. Therefore, the dynamic control of the appearance of the waypoints 250, 260 enables increased visibility of the waypoints 250, 260 while enabling other flight information symbology to be displayed, thereby reducing pilot workload and navigation and control errors, and increasing flight safety.

In an alternate embodiment, the waypoints 250, 260 of FIG. 3 have the same shape and appearance as the waypoints 250, 260 in FIG. 2, although larger due to the closer proximity. In other words, the waypoints 250, 260 as the aircraft approaches can remain elevated relative to the terrain and anchored.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for a vehicle, comprising:
 a processor configured to receive data representative of a waypoint and terrain and to supply display commands associated with the waypoint and the terrain; and
 a display device coupled to the processor for receiving the display commands and operable to render three-dimensional terrain and a first symbol elevated from the terrain representing the waypoint, wherein the first symbol is replaced by a second symbol representing the waypoint when the vehicle approaches the waypoint, the second symbol conforming to the terrain, wherein the first symbol has at least one of a different shape and a different orientation than the second symbol, wherein the waypoint is an intended geographical location within a flight plan between an originating airport and a destination airport.

2. The display system of claim 1, wherein the first symbol is elevated from the terrain and anchored to the terrain.

3. The display system of claim 1, wherein the first symbol has a first star shape and the second symbol has a second star shape.

4. The display system of claim 1, wherein the terrain has a first scale and the first symbol has a second scale, larger than the first scale.

5. The display system of claim 4, wherein the second scale is variable as a function of distance of the vehicle from the waypoint.

6. The display system of claim 1, wherein the first symbol has an appearance that is a function of use conditions.

7. The display system of claim 1, wherein the first symbol has an appearance that is a function of a current energy state of the vehicle representing a speed and altitude of the vehicle.

8. The display system of claim 1, wherein the waypoint is a first waypoint, the processor additionally receiving signals representative of a second waypoint, the display signals supplied by the processor additionally representing the second waypoint for display on the display, and the second waypoint having a different appearance than the first waypoint.

9. The display system of claim 1, wherein the waypoint has an associated approach and the first symbol is replaced by a third symbol if the vehicle misses the approach, the third symbol having a different appearance from the first symbol.

10. The display system of claim 1, wherein the first symbol has a first transparency at a first distance of the vehicle from the waypoint and a second transparency at a second distance of the vehicle from the waypoint.

11. The display system of claim 10, wherein the first symbol increases transparency as the vehicle approaches the waypoint.

12. A method of displaying a first waypoint and a second waypoint on terrain within a three-dimensional visual display of a vehicle, the method comprising the steps of:

determining, with a processor, a first distance of the first waypoint from the vehicle and a second distance of the second waypoint from the vehicle, wherein each of the first and second waypoints is an intended geographical location within a flight plan between an originating airport and a destination airport; and displaying, on a display device, a first symbol representing the first waypoint on the terrain as a function of the first distance and a second symbol representing the second waypoint on the terrain as a function of the second distance, the first symbol and the second symbol having different appearances, wherein the first and second waypoints being different colors indicating a sequential navigation order.

13. The method of claim 12, wherein the first symbol is elevated relative to the terrain and the second symbol conforms to the terrain.

14. The method of claim 12, wherein displaying step includes displaying the first waypoint at a first scale and the terrain at a second scale, smaller than the first scale.

15. The method of claim 12, wherein displaying step includes displaying the first symbol as a star shape.

16. The method of claim 12, wherein displaying step further includes displaying the first symbol and the second symbol as a function of use conditions.

17. A display system for a vehicle, comprising:

a processor configured to receive data representative of a waypoint and terrain and to supply display commands associated with the waypoint and the terrain, wherein the waypoint is an intended geographical location within a flight plan between an originating airport and a destination airport; and a display device coupled to the processor for receiving the display commands and operable to render three-dimensional terrain and a first symbol representing the waypoint elevated from the terrain and anchored to the terrain, wherein the first symbol is replaced by a second symbol representing the waypoint when the vehicle approaches the waypoint, the second symbol conforming to the terrain, wherein the first symbol has at least one of a different shape and a different orientation than the second symbol.

* * * * *